3,796,604
LITHIUM BASE ELECTROCHEMICAL GENERATOR

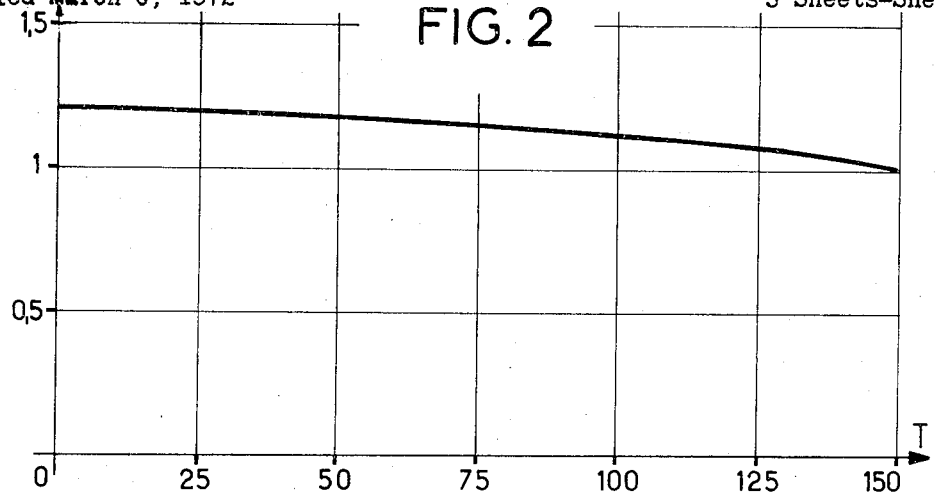
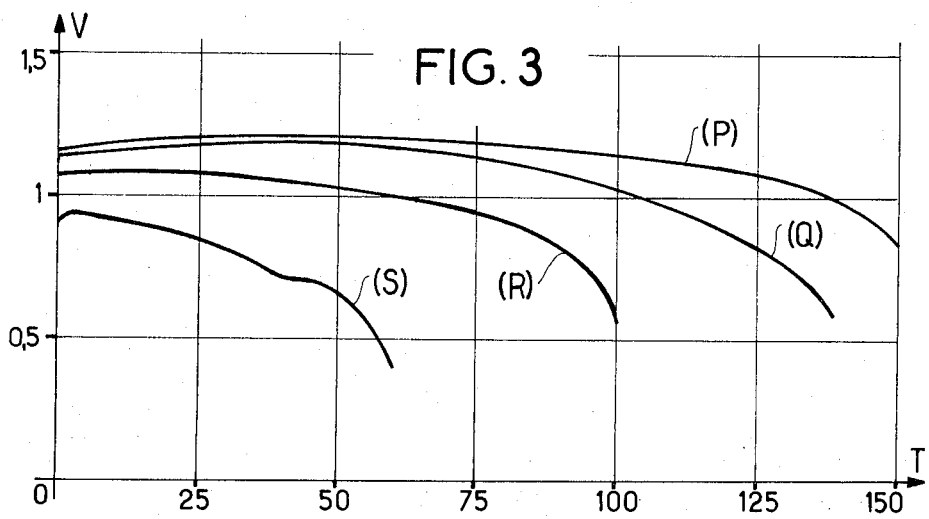
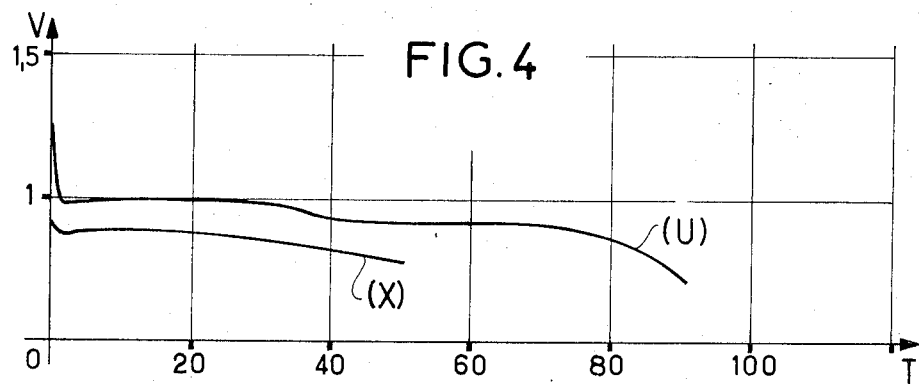

Jean-Paul Gabano and Yves Jumel, Poitiers, France, assignors to SAFT-Societe des Accumulateurs Fixes et de Traction, Romainville, France
Filed Mar. 6, 1972, Ser. No. 231,830
Claims priority, application France, Mar. 5, 1971, 7107721
Int. Cl. H01m 35/02
U.S. Cl. 136—6 LN                    14 Claims

ABSTRACT OF THE DISCLOSURE

An electrochemical generator with a non-aqueous electrolyte and a negative electrode, which mainly contains lithium. The positive active material comprises at least a fluorinated hydrocarbon polymer and a compound which can be reduced to the metallic state when discharge occurs and preferably having a value in the discharged state in the vicinity of that of the fluorinated polymer. The solvent of the electrolyte is a mixture of tetrahydrofuran-dimethoxyethane or tetrahydrofuran-dimethylether of diethylene glycol, or dioxolane.

RELATED APPLICATION

A related application by Victor Dechenaux and Francoise Drouet, entitled, "Lithium Electrochemical Generator," Ser. No. 231,832, and filed concurrently herewith is copending.

BRIEF SUMMARY OF INVENTION

This invention relates to electrochemical generators with a non-aqueous electrolyte and an active negative material which comprises a lithium base.

Applicants have noted that following surprising results:

In certain cells of the type in which the positive active material is agglomerated by means of a fluorinated polymer such as polytetrafluorethylene, for example, and in the presence of specific electrolytes a voltage level appears and in such case the practical capacity of the electrode notably exceeds its theoretical capacity as calculated from the quantity of positive active material.

Analyses carried out by radiocrystallography before and after discharge on positive electrodes prepared initially from a mixture of active material and polytetrafluorethylene (PTFE) has shown that after discharge the PTFE peak has disappeared and new peaks appear corresponding to lithium fluoride.

The reducing reaction then is $$(-CF_2-)_n + 2nLi \rightarrow nC + 2nLiF \qquad (1)$$

This is well confirmed by the presence of black carbon particles in the positive electrode in its reduced state.

In another connection, the collected capacity during the course of discharge corresponds to a 100% utilization of PTFE.

As a consequence of these results, applicants conceived the idea of utilizing the fluorinated polymers as an actual constituent of the active material in electrochemical generators embodying lithium.

Nevertheless, applicants established the fact that the nature of the solvent for the non-aqueous electrolyte played a considerable role. This was so because a number of solvents were tried by applicants without success, such as propylene carbonate.

This invention has for an object an electrochemical generator having non-aqueous electrolyte, in which the active negative material has a lithium base and characterized by the fact that the active positive material comprises at least a fluorinated hydrocarbon polymer and a compound reducible to metallic state during discharge which preferably has a value in the state of discharge in the vicinity of that of the fluorinated polymer. The solvent for the electrolyte is selected from the group consisting of mixtures of tetrahydrofuran and dimethoxyethane and tetrahydrofuran diethylene glycol dimethylether. Other heterocyclic compounds similar to tetrahydrofuran may be used as the solvent medium such as dioxolane.

As a non-limiting example, the fluorinated polymer may be selected from the group of polymers of tetrafluorethylene (PTFE) and copolymers of fluorinated ethylene and propylene (PFEP). The fluorinated hydrocarbons and their polymers are commercially available.

The reducible compounds may advantageously be selected from iron sulfide (FeS) and copper oxide (CuO).

By way of example, the proportion by weight of the fluorinated compound in the mixture with iron sulfide may be between approximately 25 and 75% and be preferably of the order of 50%.

The proportion of copper oxide in the active positive material may be, for example, between 70 and 80% by weight.

It is likewise desirable to add a conductive body to the positive active material. Such conductive body may be, for example, soot (carbon black) the proportion of soot in the active material, for example, may be of the order of from approximately 1 to 10%. Graphite may likewise be utilized advantageously in slightly higher proportions.

Appropriate metallic powders as conductive bodies, for example, may be of copper or nickel or compounds thereof.

Other objects, features and characteristics of the invention will become apparent from the following detailed description and accompanying drawings, wherein:

FIG. 2 is a graph illustrating discharge test results on a cylindrical cell having a lithium anode, a non-aqueous electrolyte and whose positive electrode comprised a mixture of PTFE, CuO and graphite, the ordinates being volts V and the abscissa being time of discharge T in hours.

FIG. 3 is a graph illustrating discharge test results on a button-type cell having a lithium anode, a non-aqueous electrolyte and a positive electrode of approximately 4 g. formed from a mixture of PTFE, CuO and soot in specific proportions, the same ordinates and abscissa as in FIG. 2 being used.

FIG. 4 is a graph illustrating discharge test results on button type cells having lithium anode, a different non-aqueous electrolyte than that of the cell of FIG. 3 and a similar positive electrode, the two curves in this FIG. 4 corresponding respectively to discharges through 50-ohm and 25-ohm resistances, the same ordinates and abscissa as in FIGS. 2 and 3 being utilized.

Figure 5:
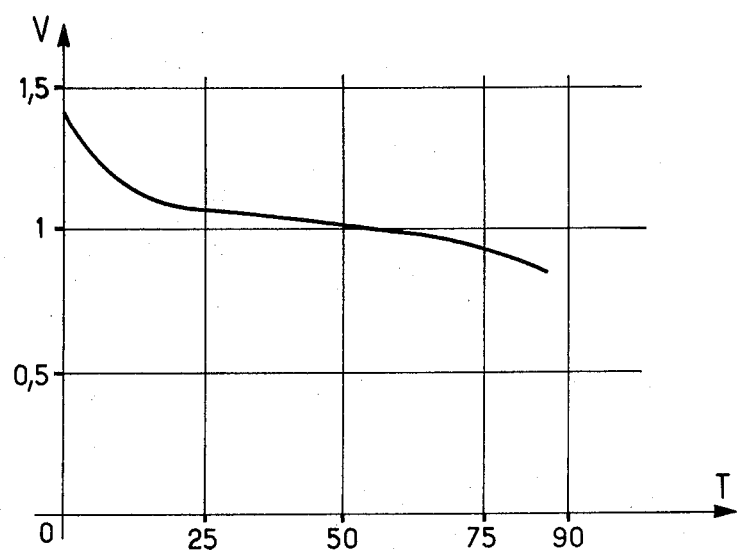

FIG. 5 is a graph illustrating discharge test results on button type cell having lithium anode, a different non-aqueous electrolyte than that of the cell of FIGS. 3 and 4 and a similar positive electrode, the curve corresponding to discharge through 50-ohm resistance, the same ordinates and abscissa as in FIGS. 2, 3 and 4 being utilized.

DETAILED DESCRIPTION

Example 1

Figure 1:
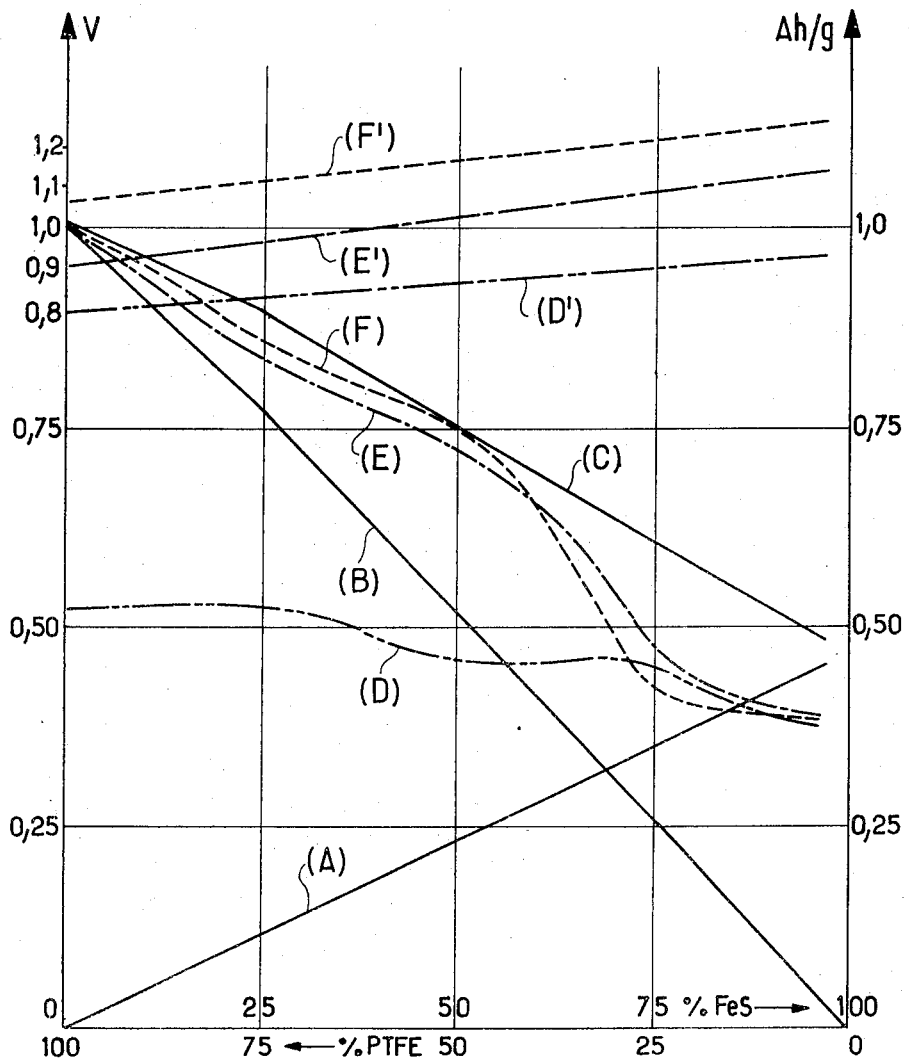
FIG. 1 is a graph illustrating test results of cells having a lithium anode in which the positive electrode was comprised approximately of 95% of a mixture of FeS-PTFE in variable proportions and approximately 2% of soot (carbon black), the abscissa representing in percent from left to right the increasing proportion of FeS and from right to left the increasing proportion of PTFE.

Referring now to the drawings and first to FIG. 1, cells with a lithium anode in which the positive electrode was formed by approximately 98% of a mixture of FeS-PTFE in variable proportions and approximately 2% soot were tested to determine as a function of these proportions the variations of capacity and voltage of such cells.

The results obtained with respect to 1 g. of cathode (positive electrode) are provided in FIG. 1 wherein the abscissa represents the composition of the positive electrode mixture. Voltage V in volts on the left side of said figure and the capacity in Ah./g. at the right side of said figure are the ordinates.

The average voltage of the cells under different discharge regimes are depicted.

As to the abscissae, the 0 point at the left corresponds to 0% FeS and 100% PTFE, while the 0 point at the right corresponds to 100% FeS and 0% PTFE. Curve A depicts the theoretical partial capacity of FeS and curve B that of PTFE.

Curve C depicts the theoretical capacity of mixtures of FeS and PTFE.

Curves D and D', E and E' and F and F' are related respectively to variations of practical capacity and average voltage for discharge conditions of the order of 1 ma./cm.$^2$, 2 ma./cm.$^2$ and 3 ma./cm.$^2$.

In each of the cells, the electrolyte was comprised of a practically molar solution of lithium perchlorate in a mixture comprising by volume approximately 70% tetrahydrofuran and approximately 30% of 1,2-dimethoxyethane.

As an alternative for such electrolyte, it is possible to utilize another comprising by volume about 20% of diethylene glycol dimethylether and approximately 80% of a solution of tetrahydrofuran containing about 150 g./l. of lithium perchlorate.

EXAMPLE 2

Referring to FIG. 2, its curve illustrates discharge test results on a cylindrical cell having a lithium anode and in which the positive electrode was formed by a mixture of PTFE, CuO and graphite comprising approximately.

|  | G. |
|---|---|
| PTFE | 0.8 |
| CuO | 4 |
| Graphite | 0.4 |

In this cell the electrolyte comprised a molar solution of lithium perchlorate LiClO$_4$ in a mixture comprising by volume 70% of tetrahydrofuran and 30% of 1,2-dimethoxyethane.

The curve of FIG. 2 depicts continuous discharge of said cylindrical cell through a resistance of 75 ohms, the time of discharge T in hours is the abscissa and volts V is the ordinate.

The average voltage of discharge is about 1.14 v., the average discharge current is 15.2 ma. and the capacity obtained is 2.28 Ah.

EXAMPLE 3

Referring to FIG. 3, its curves depict discharge test results through respective resistances of 100, 75, 50 and 25 ohms of button type cells having a lithium anode and in which the positive electrode was formed by a mixture of PTFE, CuO and soot (carbon black) comprising approximately by weight

|  | Percent |
|---|---|
| PTFE | 23 |
| CuO | 75.5 |
| Soot | 1.5 |

The electrolytes for these cells were the same as that of Example 2.

Curves P, Q, R and S of FIG. 3 correspond to continuous discharges of such button type cells respectively through resistances of 100, 75, 50 and 25 ohms.

The discharge time T in hours is the abscissa and voltage V in volts is the ordinate.

The capacities obtained were respectively 1.78, 1.89, 1.94 and 1.75 Ah. for average current densities respectively of 1.07, 1.35, 1.88 and 3 ma./cm.$^2$.

EXAMPLE 4

Referring to FIG. 4, its curves depict discharge test results through respective resistances of 50 and 25 ohms of button type cells having a lithium anode and in which the positive electrode was formed of approximately 4 g. of a mixture of PTFE, CuO and soot (carbon black) in the following proportions by weight:

|  | Percent |
|---|---|
| PTFE | 23 |
| CuO | 75.5 |
| Soot | 1.5 |

The electrolyte of these button type cells comprised an approximately 3 molar solution of BF$_4$Li in a mixture comprising by volume approximately 70% of tetrahydrofuran and approximately 30% of 1,2-dimethoxyethane.

The curves U and X correspond respectively to continuous discharges of these button type cells through 50 and 25 ohms resistances.

Discharge time T in hours is the abscissa and voltage V in volts is the ordinate.

The capacities obtained were respectively 1.50 and 1.20 Ah. for average current densities of 1.67 and 2.6 ma./cm.$^2$.

EXAMPLE 5

Referring to FIG. 5, its curve depicts discharge results through a 50-ohm resistance of a button type cell in which the positive electrode was formed of approximately 3 g. of a mixture of 15.3% PTFE, 77% CuO and 7.7% graphite.

The electrolyte consists of 1.5 molar solution of lithium perchlorate in dioxolane.

The discharge curves depicted are persuasive that electrochemical generators embodying this invention provide elevated durations of discharge.

It is understood that this invention is not limited to the described embodiments which have only been given by way of example. In particular, without departing from the spirit of the invention, variations in detail, alterations in disposition and replacements of certain means by equivalent means are possible.

What is claimed is:

1. In an electrochemical generator having a non-aqueous electrolyte, a positive electrode, and a lithium base negative active electrode, that improvement wherein active material of the said positive electrode consists of a mixture ranging from 25%–75% of a fluorinated hydrocarbon polymer together with a metallic compound reducible to metallic state during discharge of the generator selected from the group consisting and of copper oxide (CuO) and iron sulfide (FeS) together with from 10%–1% of a conductive body, said metallic compound having a discharge voltage level in the vicinity of the discharge level of said polymer, but having no discharge voltage level thereabove, and wherein said electrolyte comprises a lithium salt solute and as a solvent therefor compounds selected from the group consisting of dioxolane, mixtures of tetrahydrofuran and dimethoxyethane and mixtures of tetrahydrofuran and diethylene glycol dimethyl ether.

2. In an electrochemical generator according to claim 1, said fluorinated hydrocarbon polymer being selected from the group consisting of polymers of fluorinated ethylene and propylene.

3. In an electrochemical generator according to claim 1, said conductive body being soot.

4. In an electrochemical generator according to claim 1, said conductive body being graphite.

5. In an electrochemical generator according to claim 1, said conductive body being of metallic powder selected from the group consisting of compounds of copper and nickel.

6. In an electrochemical generator according to claim 1, said reducible compound being iron sulfide.

7. In an electrochemical generator according to claim 1, said reducible compound being copper oxide.

8. In an electrochemical generator according to claim 1, said fluorinated polymer-reducible metallic compound mixture comprising by weight approximately 25% to 75% of fluorinated polymer in said mixture.

9. In an electrochemical generator according to claim 8, said fluorinated polymer comprising by weight 50% in said mixture.

10. In an electrochemical generator according to claim 1, said electrolyte comprising an approximately molar solution of lithium perchlorate in a mixture comprising by volume approximately 70% of tetrahydrofuran and approximately 30% of dimethoxyethane.

11. In an electrochemical generator according to claim 1, said electrolyte comprising by volume approximately 20% dimethylether of diethylene glycol and approximately 80% of a solution of tetrahydrofuran and containing as solute about 150 g./l. of lithium perchlorate.

12. In an electrochemical generator according to claim 1, said electrolyte comprising an approximately 3-molar solution of $BF_4Li$ in a mixture comprising by volume approximately 70% of tetrahydrofuran and approximately 30% of dimethoxyethane.

13. In an electrochemical generator according to claim 1, said solvent being dioxolane.

14. An electrochemical storage cell comprising a non-aqueous electrolyte consisting of a 1.5 molar solution of lithium perchlorate solute in dioxolane solvent, a negative electrode containing lithium as negative active material, and a positive electrode whose positive active material comprises a mixture by weight of about 15.3% of polytetrafluoroethylene, 77% of copper oxide (CuO) and 7.7% of graphite.

References Cited
UNITED STATES PATENTS

| | | | |
|---|---|---|---|
| 3,658,592 | 4/1972 | Dey | 136—6 LN |
| 3,686,038 | 8/1972 | Garth | 136—100 R |
| 3,639,174 | 2/1972 | Kegelman | 136—6 LN |
| 3,542,602 | 11/1970 | Gabano | 136—155 |
| 3,542,601 | 11/1970 | Gabano | 136—100 R |
| 3,567,515 | 3/1971 | Maricle et al. | 136—6 LN |
| 3,514,337 | 5/1970 | Braeuer | 136—6 LN |

ALLEN B. CURTIS, Primary Examiner

C. F. LeFEVOUR, Assistant Examiner

U.S. Cl. X.R.

136—100, 155